3,706,745
CERTAIN NITROFURYL(HYDRAZINO) PYRIMIDINES
Herbert Berger, Mannheim-Kafertal, Rudi Gall, Grossachsen, Hartmut Merdes, Heidelberg, Kurt Stach, Mannheim-Waldhof, and Winfriede Sauer and Wolfgang Vomel, Mannheim, Germany, assignors to Boehringer Mannheim G.m.b.H., Postfach, Germany
No Drawing. Filed Feb. 10, 1970, Ser. No. 10,297
Claims priority, application Germany, Feb. 25, 1969,
P 19 09 346.0
Int. Cl. C07d 51/42
U.S. Cl. 260—256.4 N          7 Claims

ABSTRACT OF THE DISCLOSURE
Novel hydrazino-pyrimidines of the formula

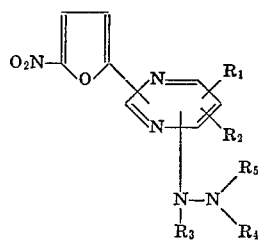

wherein $R_1$ is hydrogen or lower alkyl or azido; $R_2$ is hydrogen or lower alkyl; and $R_3$, $R_4$ and $R_5$, which may be the same or different, are hydrogen or lower alkyl, lower acyl, lower carbalkoxy, lower alkyl-sulfonyl, carbamyl, thiocarbamyl or guanyl; and the physiologically compatible salts thereof, especially those wherein the hydrazine function is in the 4-position, $R_2$ is in the 5-position, and the nitrofuryl ring is in the 2-position of the pyrimidine ring, are outstandingly active in vivo in the treatment of urinary tract infections.

---

The present invention is concerned with novel hydrazino-pyrimidines, with the preparation thereof, and with therapeutic compositions and uses utilizing these novel compounds.

The new hydrazino-pyrimidines according to the present invention are compounds of the general Formula (I):

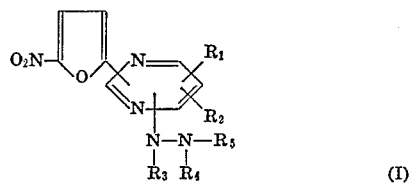

wherein $R_1$ is hydrogen or lower alkyl or azido; $R_2$ is hydrogen or lower alkyl; and $R_3$, $R_4$ and $R_5$, which may be the same or different, are hydrogen or lower alkyl, lower acyl, lower carbalkoxy, lower alkyl-sulfonyl, carbamyl, thiocarbamyl or guanyl; and the physiologically compatible salts thereof.

The new compounds according to the present invention are characterized by outstanding anti-microbial activity, and are especially suitable for use in the treatment of infections in the urinary tract. Preferred, because of their exceptionally high degree of activity, are compounds in which the (optionally substituted) hydrazine function is attached to the 4-position of the pyrimidine ring and the $R_2$ substituent is attached to the 5-position of the pyrimidine ring, in Formula I, above, i.e. $R_2$ is linked to the pyrimidine ring carbon atom adjacent to that carrying the hydrazine function. Even more preferred, because of optimum activity, are compounds in which the hydrazine group is attached to the 4-position carbon, $R_2$ is attached to the 5-position carbon, and the nitrofuryl moiety is attached to the 2-position carbon, to result in compounds having the structural Formula II:

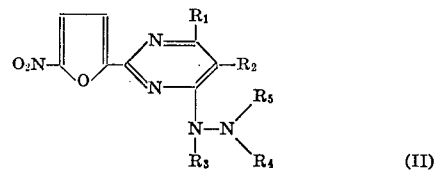

U.S. Pat. No. 3,096,332 discloses certain 2-(5-nitro-2-furyl)-pyrimidine derivatives but these known compounds only possess certain in vitro activity against bacteria; in animal experiments, they have proven to be substantially inactive (cf. J. Med. Chem., 8, 26/1965).

It has now been found, surprisingly, that the new hydrazino-pyrimidine compounds (I) according to the present invention are not only active in vitro but also exhibit an outstanding in vivo anti-bacterial action, especially in the treatment of urinary tract infections.

The new compounds according to the present invention can be prepared, for example, by one of the following methods:

(a) nitration of compounds of the general formula

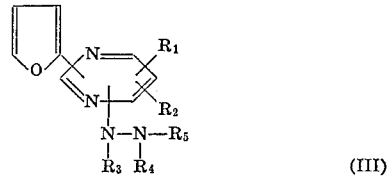

wherein $R_1$, $R_2$, $R_3$, $R_4$ and $R_5$ have the same meanings as above, followed, if desired, by saponification of any acyl radicals which may be present; or (b) reaction of halopyrimidines of the general formula:

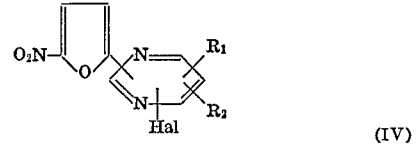

wherein $R_1$ and $R_2$ have the same meanings as above, with hydrazines of the general formula:

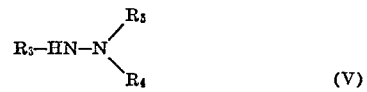

wherein $R_3$, $R_4$ and $R_5$ have the same meanings as above; whereafter, when $R_3$ and/or $R_4$ and/or $R_5$ is a hydrogen atom, the product obtained is, if desired, subsequently acylated.

The nitration of thhe furylpyrimidines (III) is carried out with the use of the conventional nitration agents, such as nitric acid/sulfuric acid, in which, if desired, sulfuric acid or acetic anhydride is used as solvent. It is expedient first to boil the starting material in acetic anhydride in order to acetylate the oxidation-sensitive hydrazine radical which may only be partially substituted and thereafter with or without isolation of the intermediate product, to carry out the nitration with a mixture of nitric acid and sulfuric acid, possibly with addition of further acetic anhydride. If desired, the acetyl radicals can subsequently be split off hydrolytically. The free hydrazine derivatives precipitate out upon neutralization of the reaction mixture.

The reaction of the halopyrimidines (IV) with the hydrazines (V) advantageously takes place by boiling in a low boiling point polar solvent, for example, in isopropanol or ketone-free ethanol. The hydrazine can hereby be used in the form of a hydrate.

When it is desired subsequently to carry out a monoacylation of the free hydrazine derivatives, this can be achieved by boiling the compound in an excess of the appropriate anhydrous acid for a comparatively long period of time. In order to obtain the peracylation products, then the compound is boiled with an excess of the appropriate acid anhydride.

For the introduction of carbalkoxy or alkyl-sulfonyl radicals, the hydrazine derivative is expediently reacted with chloroformic acid esters or with alkyl-sulfonyl chlorides, respectively, possibly with the addition of an inert polar solvent and/or of a tertiary amine.

The carbamyl and thiocarbamyl groups can be introduced by reaction of the hydrazines with cyanates or thiocyanates respectively, in appropriate solvents.

The compounds of general Formula III used as starting materials can be obtained analogously to process (b) by the reaction of non-nitrated furyl-halopyrimidines with the appropriate hydrazines.

The compounds of general Formula IV can be prepared by nitration of the appropriate furyl-halopyrimidines.

For administration, the compounds according to the present invention are made up into pharmaceutical compositions by admixture with appropriate solid or liquid pharmaceutical diluents or carriers.

The following examples are given for the purpose of illustrating the present invention:

EXAMPLE 1

2-(5-nitro-2-furyl)-4-triacetylhydrazino-5-methyl-pyrimidine

Method A: 7.9 g. 2-(2-furyl)-4-triacetylhydrazino-5-methylpyrimidine were suspended in 80 ml. acetic anhydride. A nitration mixture, consisting of 2.1 ml. 100% nitric acid and 80 ml. concentrated sulfuric acid, was then added dropwise at −10° C., while stirring. The resultant solution was thereafter stirred for a further hour at −10° C., then poured onto ice and the precipitated crystals filtered off with suction. After washing and drying, there were obtained 4.9 g. (54% of theory) of the desired paper-chromatographically uniform nitro compound, the structure of which was confirmed by elementary analysis, as well as spectroscopically. After recrystallization from alcohol, there was obtained 2-(5-nitro-2-furyl)-4-triacetyl-hydrazino-5-methyl-pyrimidine with a melting point of 153–156° C. (decomp.).

The 2-(2-furyl)-4-triaceylhydrazino-5-methylpyrimidine used as starting material was obtained by the reaction of 2-(2-furyl)-4-chloro-5-methyl-pyrimidine with hydrazine hydrate to give the corresponding hydrazino compound with a melting point of 200–204° C., which was then acetylated by boiling under reflux with acetic anhydride; it had a melting point of 172–175° C.

Method B: 2-(2 - furyl)-4-hydrazino-5-methyl-pyrimidine was stirred for one hour at 150° C. in the tenfold amount of acetic anhydride. The reaction mixture was then cooled and, without isolation of the intermediate product, i.e. 2-(2 - furyl)-4-triacetylhydrazino-5-methyl-pyrimidine, was then nitrated in the manner described above in Method A. The nitration product obtained was identical with the 2-(5-nitro-2-furyl)-4-triacetylhydrazino-5-methyl-pyrimidine obtained according to Method A.

The following compounds were obtained in an analogous manner:

2-(5-nitro-2-furyl)-4-triacetylhydrazino-pyrimidine; M.P. 174–176° C.

As starting material, there was used 2-(2-furyl)-4-tri-acetylhydrazino-pyrimidine (M.P. 98–100° C.) which was obtained by the reaction of 2-(2-furyl)-4-chloropyrimidine with hydrazine hydrate and subsequent boiling of the hydrazino compound obtained (M.P. 122–125° C.) with acetic anhydride;

2 - (5 - nitro - 2 - furyl)-6-methyl-4-triacetylhydrazino-pyrimidine; M.P. 173–175° C.

As a starting material, there was used 2-(2-furyl)-6-methyl-4-triacetylhydrazino-pyrimidine (M.P. 115–118° C.), which was obtained by the reaction of 2-(2-furyl)-6-methyl-4-chloropyrimidine with hydrazine hydrate and subsequent boiling of the hydrazino compound obtained (M.P. 167–172° C.) with acetic anhydride;

2-(5-nitro-2-furyl)-6-methyl-4-N,N'-diacetylhydrazino-pyrimidine; M.P. decomposed above 240° C.

As a starting material, there was used 2-(2-furyl)-6-methyl-4-N,N'-diacetylhydrazino-pyrimidine (M.P. 175–178° C.) which was obtained from the corresponding hydrazino compound by reaction with acetic anhydride at 50° C.;

2-(5-nitro - 2 - furyl)-6-n-propyl - 4 - triacetylhydrazino-pyrimidine; M.P. 129–131° C.

As a starting material, there was used 2-(2-furyl)-6-n-propyl - 4 - triacetylhydrazino-pyrimidine (M.P. 86–90° C.), which was obtained in the following manner: furamidine hydrochloride was condensed at ambient temperature with the sodium salt of butyryl-acetic acid ethyl ester in aqueous alcohol and the 2-(2-furyl)-6-n-propyl-4-hydroxy-pyrimidine (M.P. 163–165° C.) thus obtained was reacted with phosphorus oxychloride to give 2-(2-furyl)-6-n-propyl-4-chloropyrimidine (M.P. 42–44° C.). This was subsequently reacted with hydrazine hydrate and the hydrazino compound obtained (M.P. 114–117° C.) acetylated by boiling with acetic anhydride;

6 - (5 - nitro - 2 - furyl - 4 - triacetylhydrazino-2-methyl-pyrimidine; M.P. 136–130° C.

As a starting material, there was used 6-(2-furyl)-4-tri-acetylhydrazino-2-methyl-pyrimidine (M.P. 138–140° C.) which was obtained by the reaction of 6-(2-furyl)-4-chloro-2-methyl-pyrimidine with hydrazine hydrate and the hydrazino compound obtained (M.P. 156–158° C.) was subsequently boiled with acetic anhydride;

6 - (5 - nitro - 2 - furyl) - 4 - triacetylhydrazino - 2,5 - di-methyl-pyrimidine M.P. 213–217° C.

As a starting material, there was used 6-(2-furyl)-4-triacetylhydrazino - 2,5 - dimethyl-pyrimidine (M.P. 158–160° C.), which was obtained by the reaction of 6-(2-furyl)-4-chloro - 2,5 - dimethyl-pyrimidine with hydrazine hydrate and the hydrazino compound thus obtained (M.P. 154–156° C.) was subsequently boiled with acetic anhydride;

2 - (5 - nitro - 2 - furyl) - 4 - (1 - methyl - 2,2 - diacetyl-hydrazino)-6-methyl-pyrimidine; M.P. 168–170° C.

As a starting material, there was used 2-(2-furyl)-4-(1-methyl-hydrazino) - 6 - methyl-pyrimidine (M.P. 108–112° C.), which was obtained by the reaction of 2-(2-furyl)-4-chloro-6-methyl-pyrimidine with methyl-hydrazine and the methyl-hydrazino compound thus obtained was subsequently boiled with acetic anhydride.

EXAMPLE 2

6-(5-nitro-2-furyl)-4-(2-carbethoxy-hydrazino)-2-methyl-pyrimidine 3.0 g. 6-(2-furyl)-4-(2-carbethoxy-1-acetyl-hydrazino)-2-methyl-pyrimidine were dissolved in 30 ml. concentrated sulfuric acid at −10° C. 5.1 ml. of a nitration mixture (9 vol. percent nitric acid/sulfuric acid) were slowly added dropwise to this solution at 0–5° C. After stirring for a further hour at the same temperature, the reaction mixture was poured onto ice, brought to pH 6 by the addition of a dilute solution of sodium carbonate and then left to crystallize overnight in a refrigerator. The crystals obtained were filtered off with suction, washed with water and dried. There were thus obtained 1.0 g. (33% of theory) 6-(5-nitro - 2 - furyl)-4-(2-carbethoxy-hydrazino)-2-methyl-pyrimidine which, after recrystallization from aqueous dimethyl formamide, had a melting point of 217–218° C. Its structure was confirmed by elementary analysis, as well as by the infra-red and NMR spectra.

The 6 - (2-furyl)-4-(2-carbethoxy-1-acetyl-hydrazino)-2-methyl-pyrimidine (M.P. 118–120° C.) used as a starting material was obtained by the reaction of 6-(2-furyl)-4-hydrazino - 2 - methyl-pyrimidine with ethyl chloroformate to give the corresponding carbethoxy-hydrazino compound (M.P. 184–185° C.), which was subsequently acetylated with acetic anhydride in toluene.

EXAMPLE 3

2-(5-nitro-2-furyl)-4-hydrazino-pyrimidine 7.3 g. of the 2-(5-nitro-2-furyl)-4-triacetyl-hydrazino-pyrimidine prepared according to Example 1 where suspended in 73 ml. 6 N hydrochloric acid. The mixture was stirred for one hour at 100° C., complete solution thereby being obtained. Activated charcoal was then added to the solution, and after filtration thereof, the solution was cooled and neutralized. The crystals obtained were filtered off with suction, washed and dried. There were thus obtained 3.5 g. (75% of theory) of paper-chromatographically uniform free 2 - (5 - nitro-2-furyl) - 4 - hydrazino - pyrimidine, the structure of which was confirmed by elementary analysis, as well as spectroscopically. After recrystallization from aqueous dimethyl formamide, the compound had a melting point of 220–222° C.

The following compounds are obtained in an analogous manner:

2-(5-nitro-2-furyl)-4-hydrazino-5-methyl-pyrimidine; M.P. 225–228° C.;
2-(5-nitro-2-furyl)-4-hydrazino-6-methyl-pyrimidine; M.P. 208–210° C.;
2-(5-nitro-2-furyl)-4-hydrazino-6-n-propyl-pyrimidine; M.P. 147–149° C.;
2-(5-nitro-2-furyl)-4-(1-methyl-hydrazino)-6-methyl-pyrimidine; M.P. 174–177° C.

EXAMPLE 4

2-(5-nitro-2-furyl)-4-(2-formyl-hydrazino)-pyrimidine 1.1 g. of the 2-(5-nitro-2-furyl)-4-hydrazino-pyrimidine prepared according to Example 3 was boiled under reflux for 1.5 hours with 11 ml. formic acid. The reaction mixture was subsequently cooled, filtered and neutralized with sodium bicarbonate. The precipitated crystals were filtered off with suction and washed. There were thus obtained 0.9 g. (73% of theory) of the paper-chromatographically uniform formyl compound, the structure of which was confirmed by elementary analysis as well as spectroscopically. After recrystallization from aqueous alcohol, there was obtained 2-(5 - nitro - 2 - furyl)-4-(2-formylhydrazino)-pyrimidine, which had a melting point of 241–244° C.

The following compounds were obtained in an analogous manner:

2-(5-nitro-2-furyl)-4-(2-formyl-hydrazino)-5-methyl-pyrimidine; M.P. 245–250° C. (decomp.);
2-(5-nitro-2-furyl)-4-(2-formyl-hydrazino)-6-methyl-pyrimidine; M.P. 213–215° C. (decomp.);
2-(5-nitro-2-furyl)-4-(2-formyl-hydrazino)-6-n-propyl-pyrimidine; M.P. 213–216° C.

EXAMPLE 5

2-(5-nitro-2-furyl)-4-(2-acetyl-hydrazino)-6-methyl-pyrimidine 0.5 g. of the 2-(5-nitro-2-furyl)-4-hydrazino-6-methyl-pyrimidine prepared according to Example 3 were boiled under reflux for 1.5 hours in 5 ml. glacial acetic acid. The reaction mixture was thereafter poured onto ice and neutralized with sodium bicarbonate. The precipitated crystals were filtered off with suction, washed and dried. There were thus obtained 0.4 g. (68% of theory) of 2-(5 - nitro - 2 - furyl)-4-(2-acetyl-hydrazino)-6-methyl-pyrimidine which had a melting point of 215–217° C. and was paper-chromatographically uniform. The elementary analysis and spectra confirmed the structure of the product.

The following compounds are obtained in an analogous manner:

2-(5-nitro-2-furyl)-4-(2-acetyl-hydrazino)-pyrimidine; M.P. 238–242° C. (decomp.);
2-(5-nitro-2-furyl)-4-(2-acetyl-hydrazino)-5-methyl-pyrimidine; M. P. 250–255° C.;
2-(5-nitro-2-furuyl)-4-(2-dichloroacetyl-hydrazino)-5-methyl-pyrimidine; M.P. 242–244° C. (decomp.).

EXAMPLE 6

2-(5-nitro-2-furyl)-4-(2-propionyl-hydrazino)-6-methyl-pyrimidine

By boiling 2-(5-nitro-2-furyl)-4-hydrazino - 6 - methyl-pyrimidine with propionic acid and subsequently working up the reaction mixture in the manner described in Example 5, there was obtained 2-(5-nitro-2-furyl)-4-(2-propionyl-hydrazino)-6-methyl-pyrimidine, which had a melting point of 214–217° C.

EXAMPLE 7

2-(5-nitro-2-furyl)-4-(2-carbethoxy-hydrazino)-6-methyl-pyrimidine 2.4 of the 2-(5-nitro-2-furyl)-4-hydrazino-6-methyl-pyrimidine prepared according to Example 3 were suspended in 19.2 ml. chloroformic acid ethyl ester and heated, while stirring, for 1.5 hours at 120° C. The reaction mixture was thereafter cooled and mixed with ether. The precipitated crystals were filtered off with suction and washed. There were obtained 3.2 g. (91% of theory) 2-(5-nitro-2-furyl)-4-(2 - carbethoxy - hydrazino)-6-methyl-pyrimidine hydrochloride which was paper-chromatographically uniform and had a melting point of 215–217° C. The structure was confirmed by elementary analysis and by the spectra. If desired, the product could be recrystallized from methanol/ether.

EXAMPLE 8

2-(5-nitro-2-furyl)-4-(2-mesyl-hydrazino)-6-methyl-pyrimidine 1 g. of the 2-(5-nitro-2-furyl)-4-hydrazino-6-methyl pyrimidine prepared according to Example 3 was dissolved in 20 ml. dimethyl acetamide. After the addition of 1.3 ml. triethylamine, 1.1 g. methane-sulfonyl chloride in 10 ml. dimethyl acetamide were added thereto dropwise. The reaction mixture, which generated a small amount of heat, was then stirred for one hour, thereafter evaporated in a vacuum and the greasy residue brought to crystallization with aqueous methanol. The substance was filtered off with suction, washed and the crystals obtained were dried. In this way, there was obtained 0.6 g. (45% of theory) 2-(5-nitro-2-furyl)-4-(2-mesyl-hydrazino)-6-methyl-pyrimidine, which was paper-chromatographically uniform. The structure was confirmed by elementary analysis and by the spectra. After recrystallization from aqueous methanol/dimethylformamide, the compound had a melting point of 221–233° C. (decomp.).

The following compounds are prepared in an analogous manner:

2-(5-nitro-2-furyl)-4-(2-mesyl-hydrazino)-5-methyl-pyrimidine; M.P. 221–224° C. (decomp.);

The preparation of the 2-(5-nitro-2-furyl)-4-hydrazino-5-methyl-pyrimidine used as starting material is described in Example 3.

6-(5-nitro-2-furyl)-4-(2-mesyl-hydrazino)-2,5-dimethyl-pyrimidine; M.P. 215–217° C. (decomp.);

The preparation of the 6-(5-nitro-2-furyl)-4-hydrazino-2,5-dimethyl-pyrimidine used as starting material is described in Example 10.

EXAMPLE 9

1-[2-(5-nitro-2-furyl)-6-methyl-4-pyrimidinyl]-semicarbazide 3 g. 2-(5-nitro-2-furyl)-4-hydrazino-6-methyl-pyrimidine were suspended in 20 ml. dilute acetic acid and mixed with dimethyl acetamide until a clear solution was obtained. A solution of 2.4 g. potassium cyanate in a little water was then added and the reaction mixture stirred for one hour at ambient temperature, the reaction mixture thereby warming up slightly. Subsequently, a further 1.2 g. potassium cyanate were added. After one hour, the solution was evaporated and the residue brought to crystallization with methanol. There was obtained 1.2 g. (34% of theory) 1-[2-(5-nitro-2-furyl)-6-methyl-4-pyrimidinyl]-semicarbazide, which was paper-chromatographically uniform. The elementary analysis and spectra confirmed the structure. After recrystallization from aqueous dimethyl formamide, the compound had a melting point of 256–258° C. (decomp.).

EXAMPLE 10

6-(5-nitro-2-furyl)-4-hydrazino-2,5-dimethyl-pyrimidine 0.5 g. 6-(5-nitro-2-furyl)-4-chloro-2,5-dimethyl-pyrimidine was boiled in 10 ml. isopropanol. 0.2 ml. hydrazine hydrate was added dropwise into clear, hot solutuion. It was subsequently boiled under reflux for one hour, cooled, filtered off with suction and the substance washed with water. There was thus obtained 0.4 g. (82% of theory) 6-(5-nitro-2-furyl)-4-hydrazino-2,5-dimethyl - pyrimidine with a melting point of 210° C. (decomp). The elementary analysis and the infra-red and NMR spectra confirmed the structure of the product.

The 6-(5-nitro-2-furyl)-4-chloro-2,5-dimethyl - pyrimidine (M.P. 146–148° C.) used as starting material was obtained by the nitration of 6-(2-furyl)-4-chloro-2,5-dimethyl-pyrimidine.

The following compound was obtained in an analogous manner:

6-(5-nitro-2-furyl)-4-hydrazino-2-methyl-pyrimidine; M.P. 238–242° C.

The 6-(5-nitro-2-furyl)-4-chloro-2-methyl - pyrimidine (M.P. 173–176° C.) used as starting material was prepared by the nitration of 6-(2-furyl)-4-chloro-2-methyl-pyrimidine.

EXAMPLE 11

6-(5-nitro-2-furyl)-4-(2-carbethoxy-hydrazino)-2,5-dimethyl-pyrimidine

Using, as starting material, the 6-(5-nitro-2-furyl)-4-hydrazino-2,5-dimethyl-pyrimidine prepared according to Example 10, there was obtained, in a manner analogous to that described in Example 7, 6-(5-nitro-2-furyl)-4-(2-carbethoxy-hydrazino)-2,5-dimethyl - pyrimidine, which had a melting point of 194–196° C.

EXAMPLE 12

6-(5-nitro-2-furyl)-4-(2-acetyl-hydrazino)-2,5-dimethyl-pyrimidine 2.49 g. of the 6-(5-nitro-2-furyl)-4-hydrazino-2,5-dimethyl-pyrimidine prepared according to Example 10 were stirred for 2 hours at ambient temperature with 19 ml. acetic anhydride. The reaction mixture was subsequently diluted with ether, cooled, filtered with suction and the product washed with ether. There were thus obtained 2.7 g. (93% of theory) 6-(5-nitro-2-furyl)-4-(2-acetyl-hydrazino)-2,5-dimethyl-pyrimidine, which had a melting point of 224–226° C. The structure of the product was confirmed by elementary analysis, as well as spectroscopically.

The following compound was prepared in an analogous manner:

6-(5-nitro-2-furyl)-4-(2-acetyl-hydrazino)-2-methyl-pyrimidine; M.P. 276–278° C.

As starting material, there was used 6-(5-nitro-2-furyl)-4-hydrazino-2-methyl-pyrimidine, which was prepared in the manner described in Example 10.

EXAMPLE 13

6-(5-nitro-2-furyl)-4-(2-trifluoroacetylhydrazino)-2-methyl-pyrimidine 2.35 g. of the 6-(5-nitro-2-furyl)-4-hydrazino-2-methyl-pyrimidine prepared according to Example 10 were stirred under reflux for 3 hours in 7.7 ml. trifluoroacetic acid. The reaction mixture was subsequently evaporated in a vacuum, the residue was mixed with water, neutralized with a solution of sodium bicarbonate, cooled, filtered with suction and the substance obtained washed. There was thus obtained 1.2 g. (36% of theory) 6-(5-nitro-2-furyl)-4-(2-trifluoroacetyl-hydrazino) - 2 - methyl-pyrimidine, which had a melting point of 210–215° C. The structure was confirmed by elementary analysis, as well as spectroscopically.

EXAMPLE 14

6-(5-nitro-2-furyl)-4-(2-hydroxyacetyl-hydrazino)-2-methyl-pyrimidine 2.35 g. of the 6-(5-nitro-2-furyl)-4-hydrazino-2-methyl-pyrimidine prepared according to Example 10 were stirred for 6 hours at 80° C. in 19 ml. glycollic acid. The reaction mixture was subsequently mixed with water, neutralized with a solution of sodium bicarbonate, cooled, filtered with suction and the product obtained washed. There were thus obtained 2.0 g. (68% of theory) 6-(5-nitro-2-furyl) - 4 - (2-hydroxyacetyl-hydrazino)-2-methyl-pyrimidine, which had a melting point of 245–250° C. (decomp.). The structure was confirmed by elementary analysis, as well as spectroscopically.

EXAMPLE 15

2-(5-nitro-2-furyl)-4-hydrazino-6-azido-pyrimidine 18.5 g. 2-(5-nitro - 2 - furyl) - 4 - chloro - 6 - azido-pyrimidine (M.P. 112–116° C.; prepared by the reaction of 2-(2-furyl) - 4,6 - dichloropyrimidine with an equimolar amount of sodium azide in aqueous acetone and subsequent nitration) were stirred under reflux in 270 ml. isopropanol and 6.9 ml. 100% hydrazine hydrate, dissolved in 50 ml. isopropanol, were added dropwise. After one hour, the reaction mixture was cooled and the precipitated crystals were isolated. They were recrystallized from aqueous dioxane, with the addition of activated charcoal. There were thus obtained 10.6 g. (58% of theory) 2-(5-nitro-2-furyl) - 4 - hydrazino-6-azido-pyrimidine, which had a melting point of 189–191° C. (decomp.). The structure of the orange-yellow crystals obtained was confirmed by elementary analysis, as well as spectroscopically.

EXAMPLE 16

2-(5-nitro-2-furyl)-4-(2-formyl-hydrazino)-6-azido-pyrimidine 1.3 g. of the 2-(5-nitro-2-furyl) - 4 - hydrazino-6-azido-pyrimidine obtained according to Example 15 was dissolved in 60 ml. glacial acetic acid and mixed with 1.8 ml. formamide. After 24 hours, charcoal was added to the reaction mixture and the filtrate was mixed with ligroin/ether. In this manner, there was obtained 0.5 g. (35% of theory) ochre-yellow crystals of 2-(5-nitro-2-furyl)-4-(2-formyl-hydrazino) - 6 - azido-pyrimidine, which had a melting point of 182–185° C. (decomp.). The structure of the product was confirmed by elementary analysis, as well as spectroscopically.

EXAMPLE 17

2-(5-nitro-2-furyl)-4-(2-acetyl-hydrazino)-6-azido-pyrimidine 1.5 g. of the hydrazino compound described in Example 15 were stirred for 90 minutes at 100° C. in 30 ml. glacial acetic acid. Thereafter, the reaction mixture was evaporated in a vacuum, the residue was neutralized with a solution of sodium bicarbonate and the crystals which precipitated out were isolated. After recrystallization from dimethyl formamide/methanol, with the addition of activated charcoal, there was obtained 0.8 g. (46% of theory) pale yellow crystals of 2-(5-nitro-2-furyl) - 4 - (2-acetyl-hydrazino)-6-azido-pyrimidine, which had a melting point of 204–206° C. (decomp.). The structure was confirmed by elementary analysis as well as by the infra-red and NMR spectra.

EXAMPLE 18

2-(5-nitro-2-furyl)-4-(2-mesyl-hydrazino)-6-azido-pyrimidine 2.6 g. of the hydrazino compound described in Example 15 are dissolved in 50 ml. dimethyl acetamide. 3.06 ml. triethylamine were then added, whereafter 1.7 ml. methane sulfonyl chloride, dissolved in dimethyl acetamide, were added dropwise. The temperature of the reaction mixture thereby increasing slightly to 40° C. After one hour, the suspension was evaporated in a vacuum, the residue was neutralized with a solution of sodium bicarbonate and then brought to crystallization with methanol. After recrystallizing twice from dimethyl formamide/methanol, there was obtained 1.35 g. (40% of theory) 2-(5-nitro-2-furyl) - 4 - (2-mesyl-hydrazino) - 6 - azido-pyrimidine. The pale brown crystals melted, with decomposition, at 197–201° C. The structure was confirmed by the elementary analysis as well as spectroscopically.

The bacteriostatic activity of the compounds in accordance with the invention was evaluated in vitro with respect to the organisms set out in the following Table I.

The absolute bacteriostatic minimal concentration was determined for the following compounds 1 to 16, illustrative of the invention, as well as for the standard comparison materials A, B, C:

| Compound No.: | Chemical name |
|---|---|
| 1 | 2-(5-nitro - 2 - furyl)-4-triacetylhydrazino-pyrimidine. |
| 2 | 2-(5-nitro - 2 - furyl)-6-methyl-4-triacetylhydrazino-pyrimidine. |
| 3 | 2 - (5-nitro-2-furyl)-6-methyl-4-N,N'-diacetylhydrazino-pyrimidine. |
| 4 | 2-(5-nitro - 2 - furyl)-4-hydrazino-pyrimidine. |
| 5 | 2-(5 - nitro - 2 - furyl)-4-hydrazino-5-methyl-pyrimidine. |
| 6 | 2-(5-nitro - 2 - furyl)-4-hydrazino-6-methyl-pyrimidine. |
| 7 | 2-(5-nitro - 2 - furyl)-4-(2-formylhydrazino)-pyrimidine. |
| 8 | 2-(5-nitro - 2 - furyl)-4-(2-formylhydrazino)-5-methyl-pyrimidine. |
| 9 | 2-(5-nitro - 2 - furyl)-4-(2-formylhydrazino)-6-methyl-pyrimidine. |
| 10 | 2 - (5-nitro-2-furyl)-4-(2-acetylhydrazino)-6-methyl-pyrimidine. |
| 11 | 2 - (5-nitro-2-furyl)-4-(2-acetylhydrazino)-pyrimidine. |
| 12 | 2 - (5-nitro-2-furyl)-4-(2-acetylhydrazino)-5-methyl-pyrimidine. |
| 13 | 2 - (5-nitro-2-furyl)-4-(2-propionylhydrazino)-6-methyl-pyrimidine. |
| 14 | 2 - (5-nitro-2-furyl)-4-(2-mesylhydrazino)-6-methyl-pyrimidine. |
| 15 | 2 - (5-nitro-2-furyl)-4-(1-methyl-2,2-diacetylhydrazino) - 6 - methyl-pyrimidine. |
| 16 | 2 - (5-nitro-2-furyl) - 4 - (1-methylhydrazino)-6-methyl-pyrimidine. |
| A | N - (5-nitrofurfurylidene)-1-aminohydantoin ("Furadantin"). |
| B | 5-nitrofurfurol - semicarbazone ("Furacin"). |
| C | N-(5-nitrofurfurylidene) - 3 - amino-oxazolidone-(2) ("Furoxon"). |

The results are set forth in Table I, below, for six different bacterial species, in terms of the absolute bacteriostatic minimal concentration in micrograms of test compound per milliliter.

TABLE I.—ABSOLUTE BACTERIOSTATIC ACTIVITY IN VITRO

[Minimal concentration in μg./ml.]

| Compound No.: | Staphylococcus aureus, SG 511 | Streptococcus pyogenes Aronson | Streptococcus faecalis | Escherichia coli | Proteus mirabilis | Pseudomonas aeruginosa |
|---|---|---|---|---|---|---|
| 1 | 16 | 16 | 8 | 4 | 256 | >64 |
| 2 | 16 | 8 | 8 | 8 | >128 | >64 |
| 3 | 8 | 16 | 4 | 8 | >256 | >128 |
| 4 | 2 | 8 | 2 | 0.25 | 32 | 32 |
| 5 | 1 | 1 | 2 | 0.5 | 64 | 64 |
| 6 | 2 | 2 | 2 | 0.5 | 64 | 128 |
| 7 | 8 | 2 | 2 | 1 | 64 | 64 |
| 8 | 2 | 1 | 0.5 | 0.25 | 16 | 128 |
| 9 | 2 | 1 | 1 | 0.25 | 16 | >64 |
| 10 | 2 | 1 | 2 | 1 | 32 | >128 |
| 11 | 4 | 16 | 2 | 1 | 64 | >64 |
| 12 | 4 | 16 | 1 | 1 | 128 | >128 |
| 13 | 8 | 8 | 1 | 4 | 128 | >64 |
| 14 | 4 | 2 | 2 | 1 | 128 | 64 |
| 15 | 4 | 64 | 1 | 4 | 128 | >64 |
| 16 | 4 | 4 | 0.25 | 0.125 | 64 | 32 |
| A | 4 | 4 | 4 | 4 | 128 | 128 |
| B | 8 | 2 | 16 | 8 | 64 | >128 |
| C | 2 | 4 | 4 | 0.125 | 32 | 64 |

In addition, Compounds 1 to 16 and Comparison Compound A were evaluated with respect to their bacteriostatic activity in the excreted urine of rats following oral administration. These compounds, and the results obtained, are set forth in Table II, below. In one series of determinations, the bacteriostatic maximum dilution of urine against *Escherichia coli* was determined 22 hours after 20 milligrams of test compound per kilogram of body weight had been orally administered to the rats. Six (nine rats were employed for each experiment (test compound); the test results are calculated on the basis of 50 (75) milliliter urine samples. In a second series of determinations in the same experiments, the amount of antibacterially active test compound excreted with the urine is reported in terms of percentage of test compound initially orally administered.

Each value reported represents the result of the experiment:

TABLE II

| Compound No.: | Maximum bacteriostatic dilution (volume ratio) | Excreted test compound (percent of administered) |
|---|---|---|
| 1 | 1:20 | |
| | 1:25 | |
| | 1:3 | 2.4 |
| | 1:30 | 25 |
| | 1:65 | 34 |
| 2 | 1:50 | |
| | 1:29 | 48 |
| | 1:47 | 55 |
| 3 | 1:72 | |
| | 1:82 | 45 |
| | 1:94 | 71 |
| | 1:132 | 89 |
| 4 | 1:90 | |
| | 1:172 | 6.0 |
| | 1:72 | 3.3 |
| 5 | 1:7 | |
| | 1:20 | |
| | 1:33 | 2.2 |
| | 1:24 | |
| | 1:27 | 1.4 |
| 6 | 1:168 | |
| | 1:82 | 4.3 |
| | 1:43 | 3.5 |
| 7 | 1:336 | 29 |
| | 1:348 | 26 |
| | 1:102 | 4.9 |
| 8 | 1:110 | |
| | 1:133 | 6.2 |
| 9 | 1:263 | |
| | 1:323 | 19 |
| | 1:407 | 29 |
| 10 | 1:108 | |
| | 1:128 | 16 |
| | 1:107 | 17 |
| 11 | 1:128 | |
| | 1:248 | |
| | 1:220 | 40 |
| | 1:144 | 19 |
| 12 | 1:57 | |
| | 1:51 | 4.6 |
| | 1:45 | 4.8 |
| 13 | 1:43 | |
| | 1:43 | 11 |
| | 1:40 | 9.2 |
| 14 | 1:126 | |
| | 1:114 | 15 |
| | 1:73 | 12 |
| 15 | 1:28 | |
| | 1:18 | 11 |
| | 1:18 | |
| 16 | 1:28 | |
| | 1:17 | 0.33 |
| | 1:12 | 0.26 |
| A | 1:54 | 27 |
| | 1:30 | 30 |
| | 1:41 | 36 |
| | 1:19 | 27 |
| | 1:40 | 46 |
| | 1:21 | 31 |

The acute oral toxicity of certain representative compounds in mice was determined and the results are set forth in Table III, below, in terms of the lethal dose required to kill 50 percent of the test mice ($LD_{50}$).

TABLE III

| Compound No.: | $LD_{50}$ (in mg./kg.) |
|---|---|
| 10 | 3898 |
| 11 | 2612 |
| A | [1] 250 |
| | 138 |
| B | [2] 230 |

[1] $LD_{50}=250$ is a value published in 1964; $LD_{50}=138$ is an unpublished value determined in 1968.
[2] Value published in 1964.

It is evident from Table III that the toxicity of the compounds of this invention is significantly and surprisingly lower than that of the comparison materials.

The compounds of this invention are anti-microbials and have been found to be bactericidal to the pathogens found in surface infections, grams negative as well as gram positive. They additionally have utility as agents for routine treatment of acute and chronic bacterial infections of the urinary trace, including those caused by *Proteus ap.* Further they lend themselves because of their properties to use in the prevention of treatment of mixed surface infections or wounds, severe burns, cutaneous ulcers, pyodermas, osteomyelitis, preparation of wounds and burns for skin grafting and prevention of infection of grafts and donor sites.

The compounds of the invention can be employed in the form of aqueous solutions or suspensions thereof, as for instance, in the form of an 0.01 to 0.05% aqueous suspension or solution; in the form of solutions in non-aqueous, hydroscopic liquid vehicles such as polyethylene glycol, for instance 0.1–0.5% solutions in polyethylene glycol; incorporation into a water-soluble ointment-like base (concentration 0.1–0.5%) or in a powder base composed for instance of water-soluble polyethylene glycols (concentration 0.1–0.5%); or in a form suitable for ingestion. Thus, a preferred form is a tablet containing 50–200 mg. of active compound. Depending on the conditions, symptomatic and laboratory responses 100–400 mg. per day can be administered. Another preferred form for orally administering the compounds of the invention is in the form of a suspension thereof in a water miscible flavored gel. Such a gel can contain from 1 to 10 mg. of compound per cc.

What is claimed is:

1. Hydrazino-pyrimidines of the general formula:

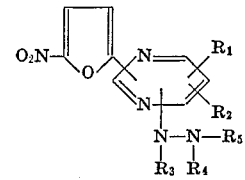

wherein $R_1$ is hydrogen or lower alkyl or azido; $R_2$ is hydrogen or lower alkyl; and $R_3$, $R_4$ and $R_5$, which may be the same or different, are hydrogen or lower alkyl, lower alkanoyl, halo-alkanoyl, and hydroxy-alkanoyl, lower carbalkoxy, lower alkyl-sulfonyl, carbamyl, thiocarbamyl or quanyl and wherein the lower alkyl radicals or moieties contain up to 3 carbon atoms; and the physiologically compatible salts thereof.

2. Hydrazino-pyrimidine as claimed in claim 1 wherein the hydrazine function is attached to the 4-position and the $R_2$ substituent is attached to the 5-position of the pyrimidine ring and wherein the lower alkyl radicals or moieties contain up to 3 carbon atoms.

3. Hydrazino-pyrimidine as claimed in claim 1 responding to the formula

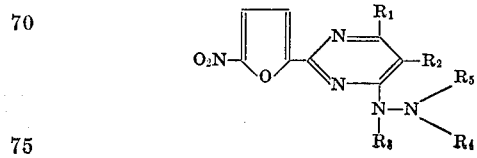

wherein $R_1$, $R_2$, $R_3$, $R_4$ and $R_5$ are as defined in claim 1.

4. Compound as claimed in claim 1 designated as 2-(5 - nitro - 2 - furyl) - 4 - (2-formylhydrazino)-pyrimidine.

5. Compound as claimed in claim 1 designated 2-(5-nitro - 2 - furyl) - 4 - (2-formylhydrazino)-6-methylpyrimidine.

6. Compound as claimed in claim 1 designated 2-(5-nitro - 2 - furyl) - 4 - (2 - acetylhydrazino) - 6 - methylpyrimidine.

7. Compound as claimed in claim 1 designated 2-(5-nitro - 2 - furyl) - 4 - (2-acetylhydrazino)-pyrimidine.

References Cited
UNITED STATES PATENTS

| | | | |
|---|---|---|---|
| 3,045,016 | 7/1962 | Miller et al. | 260—256.4 |
| 3,530,140 | 9/1970 | Kummer et al. | 260—256.4 |

ALEX MAZEL, Primary Examiner

R. J. GALLAGHER, Assistant Examiner

U.S. Cl. X.R.

260—251 R, 256.5 R; 424—251